United States Patent
Song et al.

(10) Patent No.: US 9,131,042 B2
(45) Date of Patent: Sep. 8, 2015

(54) METHOD FOR HANDLING CS CALLS IN VOICE CALL CONTINUITY, VCC APPLICATION SERVER AND TRANSLATION ENTITY

(75) Inventors: Jae-Seung Song, Seoul (KR); Kyung-Ae Yoon, Suwon (KR); Mi-Seon Ra, Seoul (KR); Hyun-Sook Kim, Seoul (KR); Patrice Hédé, Saint-Germain-en-Laye (FR)

(73) Assignee: LG Electronics Inc., Seoul (KR)

(*) Notice: Subject to any disclaimer, the term of this patent is extended or adjusted under 35 U.S.C. 154(b) by 1069 days.

(21) Appl. No.: 12/299,102

(22) PCT Filed: Apr. 10, 2007
(Under 37 CFR 1.47)

(86) PCT No.: PCT/KR2007/001733
§ 371 (c)(1),
(2), (4) Date: Feb. 23, 2009

(87) PCT Pub. No.: WO2007/126218
PCT Pub. Date: Nov. 8, 2007

(65) Prior Publication Data
US 2009/0310597 A1    Dec. 17, 2009

Related U.S. Application Data

(60) Provisional application No. 60/796,546, filed on May 2, 2006.

(30) Foreign Application Priority Data

Nov. 10, 2006  (KR) .................. 10-2006-0111208

(51) Int. Cl.
*H04L 12/66* (2006.01)
*H04M 7/12* (2006.01)
(Continued)

(52) U.S. Cl.
CPC .......... *H04M 7/128* (2013.01); *H04L 12/1428* (2013.01); *H04Q 3/0045* (2013.01); *H04W 4/18* (2013.01); *H04W 8/26* (2013.01); *H04W 76/02* (2013.01)

(58) Field of Classification Search
CPC ......................... H04L 12/1428; H04W 76/02
USPC ......................................................... 370/352
See application file for complete search history.

(56) References Cited

U.S. PATENT DOCUMENTS 6,587,688 B1 *  7/2003  Chambers et al. ............ 455/433
2003/0027569 A1   2/2003  Ejzak
(Continued)

OTHER PUBLICATIONS

LG Electronics, Processing of national and short numbers, May 8-12, 2006, 3GPP TSG-SA WG2 Architecture-S2#52, S2-061391, pp. 1-6.*

(Continued)

*Primary Examiner* — Shripal Khajuria
*Assistant Examiner* — Faisal Choudhury
(74) *Attorney, Agent, or Firm* — Birch, Stewart, Kolasch & Birch, LLP

(57) ABSTRACT

A method for handling CS (Circuit Switching) calls in a VCC (Voice Call Continuity), a VCC application server and an apparatus thereof, wherein first, the VCC application identifies whether a called party number of CS domain calls routed thereto is in an international format, secondly, the VCC application may request to convert the format of the called party number into the international format (referred to as 'routable number') if the called party number is not in the international format, thirdly, a translation entity may convert the called party number into the routable number by adding an international prefix suitable for a current location of the originating terminal based on both the called party number and location information on the originating terminal, and then the calls may continue in an IMS domain or a CS domain by the routable number.

18 Claims, 2 Drawing Sheets

(51) Int. Cl.
  *H04L 12/14* (2006.01)
  *H04Q 3/00* (2006.01)
  *H04W 4/18* (2009.01)
  *H04W 8/26* (2009.01)
  *H04W 76/02* (2009.01)

(56) References Cited

U.S. PATENT DOCUMENTS

| | | | |
|---|---|---|---|
| 2003/0027595 A1 | 2/2003 | Ejzak | |
| 2005/0176411 A1* | 8/2005 | Taya et al. | 455/414.1 |
| 2006/0030304 A1* | 2/2006 | Sofer et al. | 455/418 |
| 2006/0068786 A1* | 3/2006 | Florence | 455/435.2 |
| 2006/0077965 A1* | 4/2006 | Garcia-Martin et al. | 370/352 |
| 2006/0114913 A1* | 6/2006 | Cai et al. | 370/395.52 |
| 2006/0240820 A1* | 10/2006 | Jiang | 455/432.1 |
| 2007/0165612 A1* | 7/2007 | Buckley | 370/356 |
| 2007/0201441 A1* | 8/2007 | Buckley | 370/356 |
| 2007/0217354 A1* | 9/2007 | Buckley | 370/328 |
| 2007/0238467 A1* | 10/2007 | Buckley et al. | 455/445 |
| 2007/0254625 A1* | 11/2007 | Edge | 455/404.1 |
| 2008/0014907 A1* | 1/2008 | Chun | 455/414.1 |
| 2009/0073938 A1* | 3/2009 | Zhu et al. | 370/331 |
| 2009/0219843 A1* | 9/2009 | Chin et al. | 370/310 |
| 2009/0225725 A1* | 9/2009 | Zhu | 370/331 |
| 2010/0008353 A1* | 1/2010 | Li | 370/352 |

OTHER PUBLICATIONS

3GPP et al. "3rd Generation Partnership Project: Technical Specification Group Services and System Aspects; Voice Call Continuity between CS and IMS Study (Release 7)". 3GPP TR 23.806 V7.0.0 (Dec. 2005), pp. 1-153.

3GPP et al. "3rd Generation Partnership Project; Technical Specification Group Services and System Aspects; Voice Call Continuity (VCC) between circuit Switched (CS) and IP Multimedia Subsystem (IMS); Stage 2 (Release 7)". 3GPP TS 23.206 V7.0.0 (Sep. 2006) pp. 1-33.

* cited by examiner

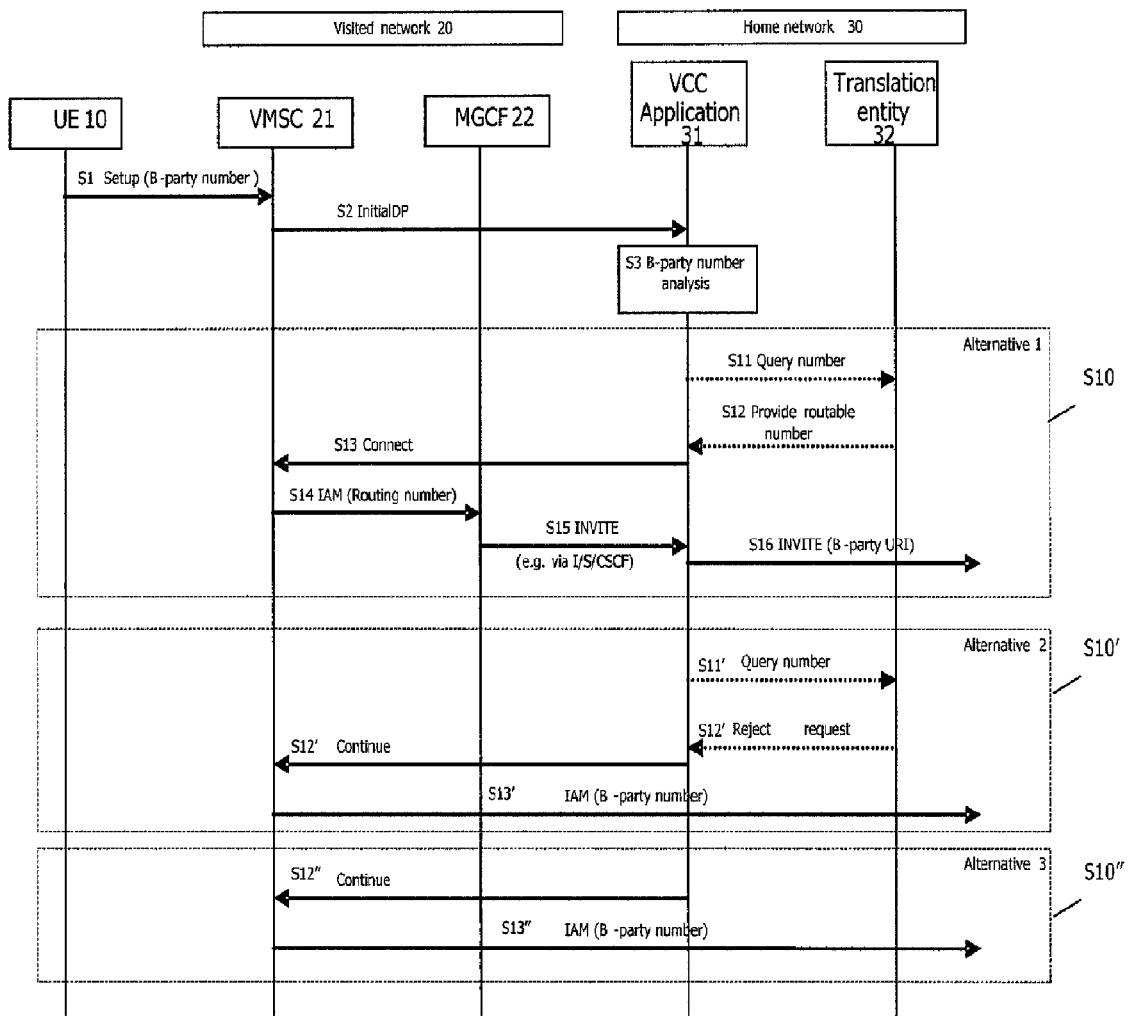

METHOD FOR HANDLING CS CALLS IN VOICE CALL CONTINUITY, VCC APPLICATION SERVER AND TRANSLATION ENTITY

BACKGROUND OF THE INVENTION

1. Technical Field

This disclosure relates to a VCC (Voice Call Continuity), and more particularly, to providing VCC subscribers receiving a roaming service with a method and device for handling CS calls (Circuit Switching calls).

2. Discussion of the Background Art

In general, a Voice Call Continuity (VCC) refers to a type of application, namely, a home IMS application which is capable of transporting voice calls between CS domain and IMS domain. As such, the VCC provides functions of 'voice-call-originations', 'voice-call-terminations' and a 'domain transfer' from the CS domain to the IMS domain or vice versa. Here, the domain transfer refers to transferring access legs for voice calls toward a user equipment (UE) (i.e., a terminal) from the CS domain to the IMS domain or vice versa during an active session. The access leg denotes a call control leg between a VCC UE and Domain Transfer Function (DTF).

The domain transfer for a certain voice call/session from the CS domain to the IMS domain or vice versa is initiated only when a DTF is positioned (located) on a signal path of the voice call/session setup. For this, positioning of the DTF on the way of the signal path of the voice call/session setup is referred to as 'anchoring in IMS' or 'anchoring'.

FIG. 1 illustrates architecture of a network for providing a VCC service.

As illustrated in FIG. 1, a VCC UE 10 denotes all types of terminals which can support the VCC service. The VCC UE 10 can access CS and PS domains. That is, when accessing the CS domain, the VCC UE 10 uses a UE-CS (not shown) provided therein, while using UE-IMS (not shown) provided therein when accessing the PS domain.

A VCC application 31 is an application server for providing the VCC service, and is constituted with entities which perform a series of functions. That is, the series of functions may include functions required to setup voice calls toward the VCC UE 10, and functions required to switch an access leg of the VCC UE 10 between the CS domain and the IMS domain with maintaining (performing) an active session. Here, the series of functions can be a domain transfer function, a domain selection function, a CS adaptation function, and CAMEL service. Detailed capabilities and operations for the series of functions are described in 3GPP TS 23.206 V1.2.0.

CS domain entities include Visited Mobile Switching Center (VMSC), Gateway MSC (GMSC), gsmSCF, and the like. IMS domain entities include P-CSCF (Proxy Call Session Control Function), S-CSCF (Serving Call Session Control Function), I-CSCF (Interrogating Call Session Control Function) and Media Gateway Control Function (MGCF).

Origination and termination of voice calls in the VCC service are briefly described as follows.

When a user of a VCC UE 10 (i.e., VCC service subscriber) originates a voice call by dialing a called party number, the voice call is first routed to a home network server subscribed by the user, namely, the VCC application 31. Even when the user dials the number in a roaming service area, the voice call originated (dialed) to the called party number by the user is routed to the VCC application 31 of the home network via a local network of the roaming service area. The VCC application 31 dials the voice call to the called party number via a CS or IMS domain.

As such, since every voice call originated by the user should be routed to the VCC application 31 of the user's home network, it is necessary to discriminate whether the called party number is a local number on a local network (e.g., on a certain local network in an overseas roaming service area) in which the user is currently positioned, or a number on a home network.

Also, if the user is currently located in an overseas roaming service area (i.e., a coverage area of a visited network) and the called party number originated by the user is the local number of the overseas roaming service area (i.e., a coverage area of a visited network), the VCC application 31 should reroute the originated voice call to the local network (i.e., the visited network). That is, the originated voice call may be routed to the home network and then may be coming back to the visited network (i.e., the network corresponding to the overseas roaming service area where the user is visiting).

In case where the VCC application 31 receives a called party number which is not in an international format, if an originating user (i.e., VCC subscriber) who has subscribed to the home network is receiving a roaming service via a network in a certain area abroad, namely, via a visited network, the VCC application 31 can not properly connect the originated calls to the called party number. That is, under a state in which a call originated by an originating user (e.g., a VCC subscriber who is roaming abroad) is routed to the VCC application 31 (i.e., a VCC application server of a home network subscribed by the originating user), if the called party number dialed by the originating user is a local number within the roaming area (i.e., the visited network), a problem may occur which the dialed called party number may be interpreted as a local number within the home network (e.g., Home PLMN). That is, the VCC application 31 (i.e., a server subscribed by the originating user and routing the user originated call) may interpret the local number originated by the originating user in a roaming area (i.e., the visited network) as if the location number in the roaming area is a local number of a home network even though the originating user intends to have dialed the local number served by the visited network (i.e., an overseas local network which the user is in).

SUMMARY OF THE INVENTION

Therefore, this disclosure is to analyze and discriminate whether a called party number of calls originated from a roaming service area (e.g., from an overseas local network) is a local number (i.e., a local number in an overseas home network) or a home number (i.e., a number in home network subscribed by a subscriber). For the sake of description of this disclosure, the local number may refer to a phone number in an overseas local network where an originating user visits, and the home number may refer to a phone number in a home network to which an originating user has subscribed.

This disclosure is also to analyze a location of an originating user and whether a called party number originated by the originating user is in an international format, wherein if the called party number is not in the international format, the format of the called party number is converted into the international format, and the originated call continues by the changed called party number.

To achieve these of this disclosure, there is provided a method for handling calls in VCC comprising: receiving, by a VCC application (or a server of a home network) a call originated by a terminal located in a CS domain and analyzing whether a called party number of the call is in an international format; requesting, by the VCC application, a translation entity to convert the format of the called party number into the international format if the analyzed called party number is not in the international format; and receiving, by the VCC application, a response with respect to the request for the conversion from the translation entity and continuing the call to the intended called party.

To achieve these of this disclosure, there is provided a method for handling calls in VCC comprising: analyzing, by a VCC application server, whether a called party number originated from a CS domain is in an international format; requesting, by the VCC application server, a translation entity to convert the called party number into a routable number in the international format; and receiving, by the VCC application server, the routable number or a reject message from the translation entity, and continuing the call to the called party.

To achieve these of this disclosure, a server of a home network performs: analyzing a called party number of a call originated by an originating terminal and location information on the originating terminal; requesting a translation entity to convert the format of the called party number into an international format if the analyzed called party number is not in the international format; and receiving a response with respect to the request for the conversion from the translation entity and continuing the originated call according to the response.

To achieve these of this disclosure, a translation entity in a VCC performs: receiving from a VCC application a message for requesting a conversion of a format of a called party number into an international format; and sending to the VCC application a routable number, which the format of the called party number is converted into the international format, or a reject message, in response to the request message.

BRIEF DESCRIPTION OF THE DRAWINGS

FIG. 2 is a signal flowchart illustrating a method for handling calls in a VCC in case where a called party number is not in an international format, in accordance with an embodiment of this disclosure.

DETAILED DESCRIPTION OF THE INVENTION

Figure 1:
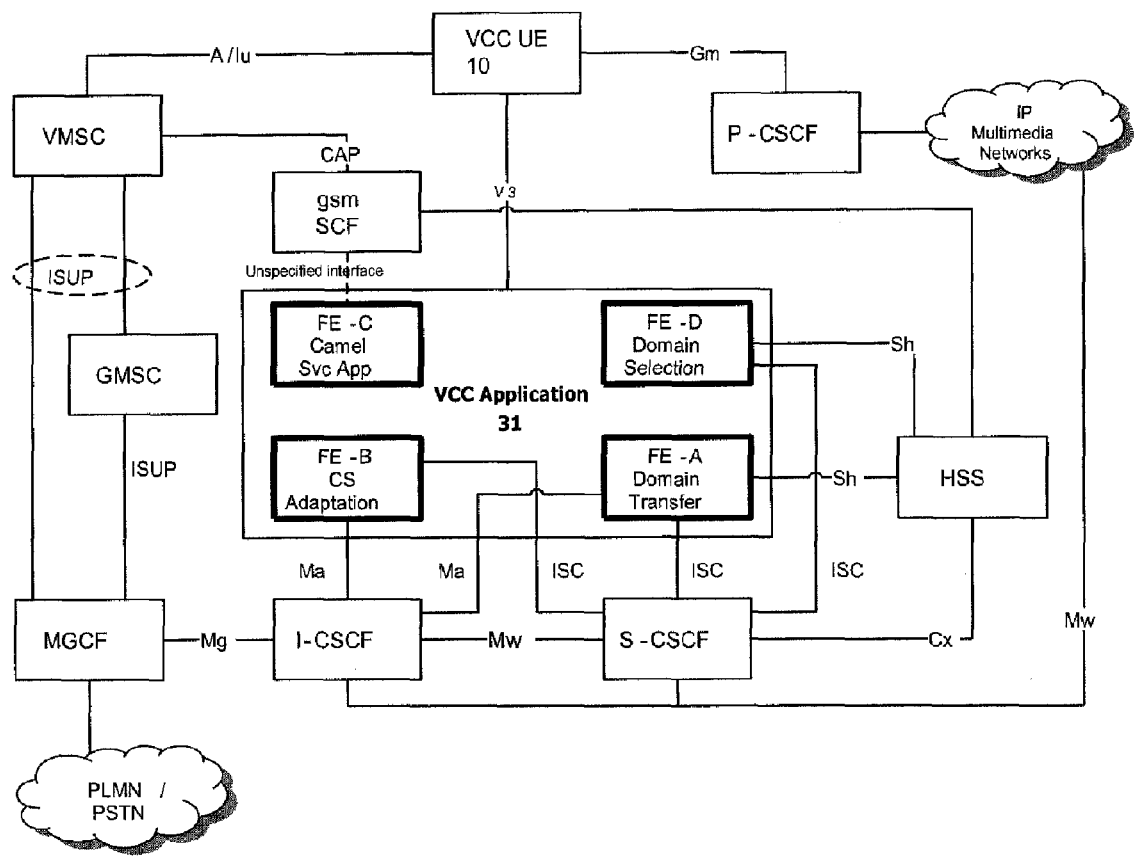
FIG. 1 is an architecture of a network providing a VCC service.

Basically, in this disclosure, first, a VCC application may discriminate whether a called party number of CS domain calls (CS calls) routed thereto is in an international (number) format or a format of a local number (or a short service number such as an emergency number, a phone directory service or a weather information service) (hereinafter, 'non-international number' indicates all of the local number, the emergency number and the short service number). Second, if the called party number is not in the international format, the VCC application may request to convert the format of the called party number into the international format (i.e., called 'routable number'). Third, a translation entity (a type of device) may convert the called party number into the 'routable number' by adding (including) an international prefix and a province/area code suitable for a current location of a calling (originating) terminal based upon location information of the originating terminal and the called party number. Fourth, the calls may continue in an IMS domain or CS domain by the converted 'routable number'.

When a user (i.e., originating user) currently using a CS network dials a certain called party number, the called party number may be either an international number or a non-international number (i.e., a number having no international prefix or country code). Here, the called party number is sent by being included in a SETUP message for establishing a VCC session. If the called party number is in the international format, the VCC application routes the call (i.e., the call originated by the originating user) depending on other criteria, as disclosed in detail in 3GPP TS 23.206.

However, if the called party number is not in the international format but in the non-international format, operations as illustrated in a signal flowchart of FIG. 2 are performed.

FIG. 2 is a signal flowchart illustrating a method for handling calls in a VCC in case where a called party number is not in an international format, in accordance with an embodiment of this disclosure. However, FIG. 2 may include three embodiments just in one drawing according to this disclosure, and one drawing illustrates the first to the third embodiments for the sake of brief explanation. That is, the first embodiment of this disclosure in FIG. 2 may be implemented by a series of operations including steps S1 to S3 and S10. The second embodiment of this disclosure in FIG. 2, may be implemented by a series of operations including steps S1 to S3 and S10'. Also, the third embodiment of this disclosure in FIG. 2, may be implemented by a series of operations including steps S1 to S3 and S10".

In FIG. 2, a terminal 10 is a user equipment (UE) which has a VCC subscription and is capable of using a VCC service. Embodiments in FIG. 2 may illustrate signal flows in case of originating a CS call by the terminal 10. The originated CS call is sent to an intended B-party (i.e., terminated party) via a visited network 20 and a home network 30. Here, the visited network 20 may be a local network in a region in which a user is currently located (e.g., a certain region in another country where the user visits and is provided with a roaming service). The visited network 20 may include a VMSC 21 and a MGCF 22. The home network may include a VCC application 31 and a translation entity 32.

Hereinafter, functions and operations of the translation entity 32 are described.

The translation entity 32 may be a type of device as a physical or logical entity for interpreting (analyzing) location information on the terminal 10 and a called party number in order to convert the format of the called party number into an international format (hereinafter, referred to as 'routable number' for the sake of the explanation).

The translation entity 32 may also be an internal entity configured in the VCC application 31 and be a stand-alone external entity from the VCC application 31.

The translation entity 32 can store operator policy and translation policy (rules) based upon the location of the originating terminal 10 (e.g., a visited network corresponding to the roaming service area, and access the policies according to a request.

For any request to converts the called party number into the routable number (i.e., indicated as 'Query number' in FIG. 2), the translation entity 32 sends a response message (or signal) with respect to the conversion request based upon the operator policy and the translation policy. That is, the translation entity 32, based upon the operator policy, 1) sends a message for rejecting the request and may not anchor the call in the VCC application 31, or 2) may send a response without converting the called party number into the routable number (e.g., since the call is originated from a Home PLMN (Public Land Mobile Network) and the called party number is routable to the Home PLMN, the called party number does not have to be converted to the international format). 3) Also, the translation entity 32 checks the translation policy and operator policy to be applied to the location of the originating terminal 10, to send a number converted into the routable number or to reject the request.

The translation entity 32 obtains, from the translation policy, an international prefix or country code and a province/area code based on the location information on the terminal 10 and the called party number. Here, the location information and the called party number are all sent by the VCC application 31. The translation entity 32 may convert (change, or make, or create, or produce) the called party number into the 'routable number' or 'routable URI' (i.e., a number or URI in an international format) using the obtained international prefix and province/area code.

In one example, it is assumed that firstly a user (referred to as 'A-party' as an originating user) of the terminal 10 has subscription in a home network 30 in Canada, secondly the A-party is visiting and now staying (located) at Paris in France, and thirdly an area in which the A-party is located (i.e., Paris in France) may provide such a communication service as a roaming service via a visited network 20. Here, if the A-party dials a called party number "06 12 34 56 78", the translation entity 32 may convert the format of the called party number (i.e., a called party number not in the international format) into an international format based upon the called party number and the location information on the A-party (e.g., ID of the visited network (20), ID of VMSC (21) or ID of VPLMN (visited PLMN)). In other words, the translation entity 32 may find (retrieve, or fetch, or search) a country code of the current area (i.e., France) of the A-party (i.e., '33' of the country code of France) with reference to the operator policy and the translation policy, and may convert the format of the called party number into the international format, namely, "33 06 12 34 56 78".

In another example, it is assumed that an A-party subscribed to a home network 30 of Canada has dialed (called) a short number "3250" which provides weather information on a current location while he stays at Paris in France. This call is handled by being routed to the home network 30 of Canada. In particular, the translation entity 32 recognizes that the call has been dialed from France based upon location information on the A-party (e.g., ID of the visited network 20, ID of VMSC 21 or ID of VPLMN (Visited PLMN)), and then may convert the short number "3250" into the routable number (international format). That is, the translation entity 32 may retrieve an actual number (e.g., "892 68 08 08") corresponding to the short number "3250" which provides the French weather service from the translation policy. The translation entity 32 may combine the actual number with the country code (i.e., "33" of the country code of France) and accordingly convert the actual number into the routable number (i.e., 33 892 68 08 08).

Hereinafter, the steps S1 to S3 equally performed in the first to third embodiments of this disclosure in FIG. 2 are described.

The terminal 10 may send a SETUP message (i.e., corresponding to an originated (dialed) call) to a VMSC 21 of the visited network (20) (i.e., a local network which is currently providing the terminal user with a roaming service) (S1). Here, the SETUP message may include a called party number (i.e., B-party number).

The VMSC 21 may send an initial DP message to a gsm-SCF (not shown in FIG. 2) linked to the VCC application 31 (S2). Here, the initial DP message may include not only the B-party number but also at least one or more of ID of the VMSC 21, ID of the visited network 20 and ID of the VPLMN (not shown in FIG. 2) as location information on the terminal 10.

The VCC application 31 may analyze the B-party number and the location information on the terminal 10 from the initial DP message (S3). If it is analyzed that the terminal 10 is currently located abroad, the VCC application 31 may check whether the B-party number is in the international format (S3). Here, the B-party number may be analyzed by a functional entity (e.g., gsmSCF) involved with the VCC application 31, instead of the VCC application 31. The gsm-SCF may be a physical or logical functional entity which is integrally configured in the VCC application 31 or be a physical entity configured outside the VCC application 31.

If the B-party number is in the international format in the step S3, the VCC application 31 may anchor the call originated by the user depending on other criteria, as disclosed in detail in 3GPP TS 23.206. However, if the B-party number is not in the international format but in a non-international format (e.g., a local number subscribed in the visited network or a short number providing a certain additional service), the VCC application 31 may perform one of particular steps S10, S10' and S10" as a series of operations. Here, the series of operations for the particular step S10 may correspond to the embodiment in which the VCC application 31 anchors the B-party call (originated call) in an IMS domain and then routes it to the called party (B-party). The series of operations for the other particular steps S10' and S10" may correspond to the embodiments in which the VCC application 31 does not anchor the B-party number in the IMS domain, but may let the B-party call continue in a CS domain.

Hereinafter, the step S10 corresponding to the first embodiment of this disclosure is described.

The VCC application 31 may provide the B-party number and location information on the terminal 10 (the user's UE) to the translation entity 32, and request the translation entity 32 to convert the format of the B-party number (i.e., 'Query number' of FIG. 2) (S11). Here, the B-party number may be in the non-international format, and the location information on the terminal 10 may be, for example, at least one or more of one or more entity's IDs such as ID of the visited network 20, ID of the VMSC 21, the ID of the VPLMN and so on. The translation entity 32 derives an international number (or URI) including a country code (or international ID) corresponding to a current location of the terminal 10 of the originating user (i.e., A-party), based upon the B-party number and the location information on the terminal 10 of the originating user (e.g., ID of the VMSC 21). Here, the translation entity 32 may convert the format of the B-party number into the international format (i.e., routable number) based on operator policy and translation policy. Meanwhile, the process of converting the B-party number into the routable number by the translation entity 32 is the same as that aforementioned.

The translation entity 32 may provide (give, or deliver) the 'routable number' converted from the B-party number in the step S11 (i.e., the number or URI having the international format converted from the non-international format) to the VCC application 31 (or the gsmSCF) (S12). The VCC application 31 may perform a domain transfer for the originated call from a CS domain to an IMS domain, and continue the originated call toward the B-party by the routable number (S13 to S16). That is, in the steps S13 to S16, the VCC application 31 may anchor the originated call from the CS domain into the IMS domain, and may route the call to the B-party.

The VCC application 31 may send the originated call (i.e., referred to as Connect message in FIG. 2) to the VMSC 21 (S13). The VMSC 21 may route the originated call (i.e., referred to as IAM (Routing number) message in FIG. 2) to the MGCF 22 (S14). The MGCF 22 may send a SIP message (e.g., INVITE message) to the VCC application 31 to continue the originated call from the terminal 10 (S15). Then, the VCC application 31 may anchor the originated call, and send the SIP message (i.e., INVITE message) to the B-party number obtained from the translation entity 32 in the step S12 (i.e., the routable number converted into the international format) (S16).

Hereinafter, the step S10' corresponding to the second embodiment of this disclosure is described.

After performing the steps S1 to S3, the VCC application 31 may provide both the B-party number and the location information (e.g., at least one or more of one or more entity's IDs such as ID of the visited network 20, ID of the VMSC 21, the ID of the VPLMN and so on) on the terminal (i.e., the originating user's UE) to the translation entity 32. The VCC application 31 then may request the translation entity 32 to convert the format of the B-party number (i.e., 'Query number' in FIG. 2) (S11'). After receiving the 'Query number' in the step S11', the translation entity 32 may analyze both the B-party number and the location information (e.g., ID of the VMSC 21), and check whether it has stored operator policy and translation policy corresponding to the location (i.e., the area or the visited network where the terminal is currently located).

That is, the translation entity 32 may inquire the operator policy and the translation policy according to the location information on the originating terminal 10 and the B-party number, and may check whether the format of the B-party number is allowed to be converted into the international format.

If the translation entity 32 is not able to convert the format of the B-party number into the international format (or URI) (i.e., routable number) in the step S11', the translation entity 32 may send to the VCC application 31 a message indicating the failure of conversion into the international format (referred to as 'Reject request' in FIG. 2) (S12')

The VCC application 31 (or gsmSCF) may receive the 'Reject request' message from the translation entity 32, and may send a 'Continue' message to the VMSC 21 of the visited network 20 to let the call continue (S13'). The VMSC 21 may continue the originated call and may route the call to the intended B-party (referred to as 'IAM' message in FIG. 2) (S14').

Hereinafter, the step S10" corresponding to the third embodiment of this disclosure is described.

In the third embodiment of this disclosure, the originated call from the terminal 10 may not be routed to the VCC application 31 based upon the operator policy, but rather the originated call may continue to the B-party by the VMSC 21 of the visited network 20.

In other words, after performing the steps S1 to S3, the VCC application 31, based upon the operator policy, may determine that the originated call anchored in the VCC application 31 is not routed via the IMS domain. Therefore, the VCC application 31 may send the 'Continue' message to the VMSC 21 of the visited network 20 to let the originated call continue to the B-party (S13"). The VMSC 21 may continue the originated call and then routes the originated call to the intended B-party (i.e., 'IAM' message in FIG. 2) (S14").

As described above, this disclosure has been explained with reference to the embodiments which are merely exemplary. It will be apparent to those skilled in the art that various modifications and variations can be made in this disclosure. For example, the embodiments of this disclosure illustrate the case where the call originated by the terminal 10 is a phone number, but they may be applicable to other embodiments of this disclosure in which the originated call is a URI. Also, the functions and operations of the VCC application explained in the first to third embodiments of this disclosure may equally be performed by the gsmSCF. Thus, it is intended that this disclosure cover modifications and variations of this invention provided they come within the scope of the appended claims and their equivalents.

As described above, in this disclosure, if a called party number originated by an originating user while is stay abroad and provided with a roaming service is not in an international format, the called party number can be converted into a routable number.

The invention claimed is:

1. A method comprising:
   receiving, by a Voice Call Continuity (VCC) application server, a voice call of a Circuit Switched (CS) domain that originated from a VCC user equipment (UE) using a called party number,
   wherein the VCC application server supports an Internet protocol Multimedia Subsystem (IMS) and handles VCC between the CS domain and an IMS domain for the VCC UE,
   wherein if the called party number is not an international number format and the VCC UE is in a home network, no translation of the called party number into the international number format is required and the received voice call is anchored in the IMS,
   wherein if the called party number is not the international number format and the VCC UE is not in the home network but is in a visited network, the translation of the called party number into the international number format is performed by the VCC application server based on translation rules and the received voice call is anchored in the IMS, and
   wherein if the called party number is a short number defined in the visited network which is different from a short number defined in the home network and is not the international number format and the VCC UE is not in the home network but is in the visited network, a conversion of the short number defined in the visited network into an actual number related to a service provided by the visited network is performed by the VCC application server, the translation of the actual number into the international number format is performed by the VCC application server based on translation rules and the received voice call is anchored in the IMS.

2. The method of claim 1, wherein the VCC UE is determined to be located in the home network by using location information comprising at least one among an identity of the home network, an identity of a Home Mobile Switching Center (HMSC), and an identity of a Home Public Land Mobile Network (HPLMN).

3. The method of claim 2, wherein the VCC UE is determined to be located in the visited network or a roaming service area by using location information comprising at least one among an identity of the visited network, an identity of a Visited Mobile Switching Center (VMSC), and an identity of a Visited Public Land Mobile Network (VPLMN).

4. The method of claim 3, wherein when the VCC UE is in the visited network and the called party number is in the international number format, the translation of the called party number into the international number format is not performed and the received voice call is not anchored in the IMS.

5. The method of claim 4, wherein when the translation of the called party number into the international number format is not performed and the received voice call is not anchored in the IMS, a domain transfer is not supported for the received voice call.

6. The method of claim 1, wherein if the VCC UE is not in the home network but is located in the visited network with known international number format translation rules for the called party number, the translation of the called party number into the international number format is performed and the received voice call is anchored in the IMS.

7. The method of claim 1, wherein if the VCC UE is not in the home network but is located in the visited network with no known international number format translation rules for the called party number, the translation of the called party number into the international number format is not performed and the received voice call is not anchored in the IMS.

8. The method of claim 1, wherein if the received voice call is not anchored in the IMS, a domain transfer is not supported for the received voice call.

9. The method of claim 1, wherein if the called party number is not in the international number format, a domain transfer of the received voice call from the CS domain into the IMS domain is performed.

10. An apparatus comprising:
a processor operatively connected to a Domain Transfer Function (DTF) entity, a Domain Selection Function (DSF) entity, a Circuit Switched Adaptation Function (CSAF) entity, a Circuit Switched Adaptation Function (CSAF) entity, and a Customized Application for Mobile network Enhanced Logic (CAMEL) service entity;
the DTF entity configured to transfer, via the processor, a Voice Call Continuity (VCC) user equipment (UE) access;
the DSF entity configured to provide, via the processor, a selection of a domain for delivering voice calls from the VCC UE;
the CSAF entity configured to facilitate, via the processor, domain transfer procedures; and
the CAMEL service entity configured to further facilitate, via the processor, the domain transfer procedures,
wherein the DTF entity, the DSF entity, the CSAF entity, and the CAMEL service entity are part of a Voice Call Continuity (VCC) application server and cooperate to perform the steps of:
receiving, by the VCC application server, a voice call of a Circuit Switched (CS) domain that originated from the VCC UE using a called party number,
wherein the VCC application server supports an Internet protocol Multimedia Subsystem (IMS) and handles VCC between the CS domain and an IMS domain for the VCC UE,
wherein if the called party number is not an international number format and the VCC UE is in a home network, no translation of the called party number into the international number format is required and the received voice call is anchored in the IMS,
wherein if the called party number is not the international number format and the VCC UE is not in the home network but is in a visited network, the translation of the called party number into the international number format is selectively performed by the VCC application server based on translation rules and the received voice call is anchored in the IMS, and
wherein if the called party number is a short number defined in the visited network which is different from a short number defined in the home network and is not the international number format and the VCC UE is not in the home network but is in the visited network, a conversion of the short number defined in the visited network into an actual number related to a service provided by the visited network is performed by the VCC application server, the translation of the actual number into the international number format is performed by the VCC application server based on translation rules and the received voice call is anchored in the IMS.

11. The apparatus of claim 10, wherein the VCC UE is determined to be located in the home network by using location information comprising at least one among an identity of the home network, an identity of a Home Mobile Switching Center (HMSC), and an identity of a Home Public Land Mobile Network (HPLMN).

12. The apparatus of claim 11, wherein the VCC UE is determined to be located in the visited network or roaming service area by using location information comprising at least one among an identity of the visited network, an identity of a Visited Mobile Switching Center (VMSC), and an identity of a Visited Public Land Mobile Network (VPLMN).

13. The apparatus of claim 12, wherein when the VCC UE is in the visited network and the called party number is in the international number format, the DTF entity, the DSF entity, the CSAF entity, and the CAMEL service entity further cooperate to not perform the translating of the called party number into the international number format, and the received voice call is not anchored in the IMS.

14. The apparatus of claim 13, wherein when the translating of the called party number into the international number format is not performed and the received voice call is not anchored in the IMS, a domain transfer is not supported for the received voice call.

15. The apparatus of claim 10, wherein if the VCC UE is not in the home network but is located in the visited network with known international number format translation rules for the called party number, the translation of the called party number into the international number format is performed and the received voice call is anchored in the IMS.

16. The apparatus of claim 10, wherein if the VCC UE is not in the home network but is located in the visited network with no known international number format translation rules for the called party number, the translation of the called party number into the international number format is not performed and the received voice call is not anchored in the IMS.

17. The apparatus of claim 10, wherein if the received voice call is not anchored in the IMS, a domain transfer is not supported for the received voice call.

18. The apparatus of claim 10, wherein if the called party number is not in the international number format, a domain transfer of the received voice call from the CS domain into the IMS domain is performed.

* * * * *